United States Patent
Huang et al.

(10) Patent No.: US 7,301,715 B2
(45) Date of Patent: Nov. 27, 2007

(54) PREAMPLIFIER FLY HEIGHT CONTROL (FHC) DRIVER AND SENSING CIRCUIT

(75) Inventors: Congzhong Huang, Plano, TX (US); Bryan E. Bloodworth, Irving, TX (US); Mike Sheperek, Longmont, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/135,788

(22) Filed: May 23, 2005

(65) Prior Publication Data

US 2005/0213243 A1    Sep. 29, 2005

Related U.S. Application Data

(62) Division of application No. 10/735,150, filed on Dec. 12, 2003, now Pat. No. 7,068,458.

(51) Int. Cl.
*G11B 5/09* (2006.01)
*G11B 5/02* (2006.01)
*G11B 21/02* (2006.01)
*G11B 27/36* (2006.01)

(52) U.S. Cl. .............................. 360/46; 360/75; 360/67

(58) Field of Classification Search .................. None
See application file for complete search history.

(56) References Cited

U.S. PATENT DOCUMENTS

| | | | |
|---|---|---|---|
| 5,877,911 A * | 3/1999 | Klaassen et al. | 360/67 |
| 6,266,203 B1 | 7/2001 | Street et al. | |
| 7,119,990 B2 * | 10/2006 | Bajorek et al. | 360/128 |
| 2004/0114268 A1 * | 6/2004 | Satoh et al. | 360/75 |

* cited by examiner

*Primary Examiner*—William R. Korzuch
*Assistant Examiner*—Jason Olson
(74) *Attorney, Agent, or Firm*—Dolly Y. Wu; Wade J. Brady, III; Frederick J. Telecky, Jr.

(57) ABSTRACT

Managing temperature of a read/write head (120) in a disk drive system in which there is a power variance due to different operation modes. A circuit device (100) determines and delivers additional power needed for compensating for the temperature variance due to different operational power requirements. The power is delivered to a resistive heater (Rheat) associated with the head (120). The compensating power is based on the delivery voltage, delivery current, and resistance of the resistive heater (Rheat). The delivery current is varied to account for changes in the resistance of the resistive heater (Rheat) since it can vary with temperature. By sensing the current with a sensor (13), the resistance is determined via the sensed current and the delivery voltage. The current is adjusted for maintaining the compensating power.

12 Claims, 3 Drawing Sheets

PREAMPLIFIER FLY HEIGHT CONTROL (FHC) DRIVER AND SENSING CIRCUIT

This application claims priority under 35 USC § 120 of application Ser. No. 10/735,150, filed Dec. 12, 2003 now U.S. Pat. No. 7,068,458. This application is a divisional of the above mentioned application.

FIELD OF THE INVENTION

The invention relates generally to control devices and, more particularly, to a control driver for disc drive systems.

BACKGROUND OF THE INVENTION

In disc drive systems, the discs are mounted on a hub of a spindle motor for rotation at an approximately constant high speed during the operation of the disc drive. An actuator assembly in the disc drive moves magnetic transducers, also called read/write heads, to various locations relative to the discs while the discs are rotating, and electrical circuitry is used to write data to and read data from the media through the read/write heads. The fly height, also called clearance, is a distance between the read/write head and the media.

Disc drives are being produced with increasing track densities and decreasing access times. A read/write head must fly over the media of a disc as closely as possible to improve reading and writing access times. Further, the fly height of the head should be approximately uniform from read mode to write mode and during the reading and writing to improve system performance.

Several variables can affect the fly height of a head. For example, fly height is impacted by a curvature of a disc, vibrations of the disc caused by the spindle motor, and roughness and defects in the media. Fly height is also affected by variation in the heat dissipated in the head due to the differential in the power characteristics of the head while in the read mode versus the write mode. For example, heat causes the read/write head to expand. As more power is delivered to the head, the head tends to expand more. Therefore, the head will tend to expand more during a reading or writing operation as the head heats up. The head will also expand more during the write mode since it requires more power to write than read. The disturbance decreases performance and/or increases the possibility of an error in reading from or writing to the media.

Several efforts have been made to improve control of the fly height of a read/write head. However, none of the efforts have resulted in a suitable solution to the aforementioned heat disturbance problem. There remains a need for a system to control the fly height of a read/write head to allow it to read data from or write data to closely spaced media.

SUMMARY

The present invention achieves technical advantages as a method, apparatus and system for managing temperature variations in an electronic device. For example, managing temperature variations in a disc drive read/write head which are due to power variance of the read and write modes. Additional power needed for compensating for the temperature variance due to different operational power requirements is determined and delivered for resistive heating, for example, in a resistive heater to increase temperature. The resistive heater is in a heat transfer relationship with the read/write head such that the heat due to the delivery of additional power to the heater is transferred to the head. The compensating power is based on the delivery voltage, delivery current, and resistance of the resistive heater. The delivery current is varied to account for changes in the resistance of the resistive heating since it can vary with temperature. By sensing the current, the resistance can be determined via the sensed current and the delivery voltage. The current is adjusted for maintaining the compensating power.

BRIEF DESCRIPTION OF THE DRAWINGS

For a more complete understanding of the present invention, reference is made to the following detailed description taken in conjunction with the accompanying drawings wherein.

DETAILED DESCRIPTION

Figure 1:
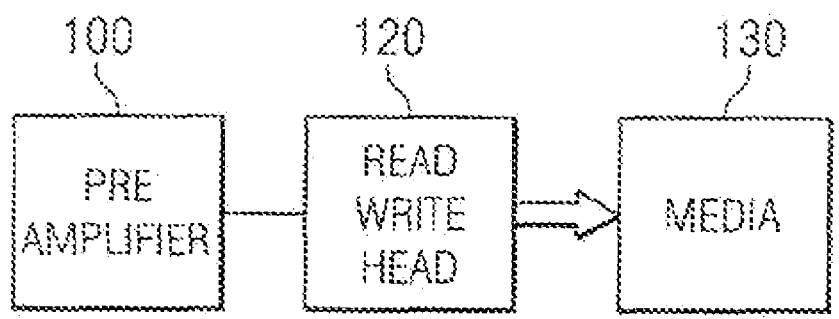
FIG. 1 illustrates a read/write driver system in accordance with exemplary embodiments of the present invention.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

The following inventive embodiments are described in terms of a disc drive system, however, the invention can also be used in other systems or devices in which heat control to an electronic element can improve performance. Referring now to FIG. 1 there is illustrated a disc drive system in accordance with exemplary embodiments of the present invention. The system includes a preamplifier 100 coupled with a read/write head 120 along an extended arm (not shown) reaching adjacent a magnetic storage disc. The head 120 is typically suspended on the extended arm in close media proximity with media 130. Media 130 is typically a magnetic storage disc. The preamplifier 100 includes circuitry for applying both read and write signals to the head 120. The preamplifier 100 is also adapted to determine the signal power for each of the read and write modes.

Because of the variance in power delivered to the head 120 from the read mode to the write mode, there results a corresponding variance in the heat delivered to the head 120. According to exemplary embodiments of the present invention, the preamplifier 100 is used to manage heating of the head 120 such that the heat is maintain at a constant value despite variable heating resulting from variable power delivery to the head 120 for the different operation modes. The preamplifier 100 determines additional power requirements needed for compensating for the temperature variance due to different operational power requirements (i.e., reading and writing modes) and delivers the appropriate amount of heat to the head 120 (via resistive heating, for example). The preamplifier 100 can include a resistive heater arranged in a heat transfer relationship with the read/write head 120 such that heat from the resistive heater due to the delivery of the compensation power to the heater is transferred to the head 120.

The compensating power is based on the delivery voltage, delivery current, and resistance of the resistive heater. The preamplifier 100 is operable for varying the delivery current to account for changes in the resistance of the heater since the heater's resistance can vary with temperature. For detecting the resistance of the heater, the preamplifier 100 includes a sensor for sensing the current delivered and determining the resistance of the heater based on the delivery voltage.

Figure 1A:
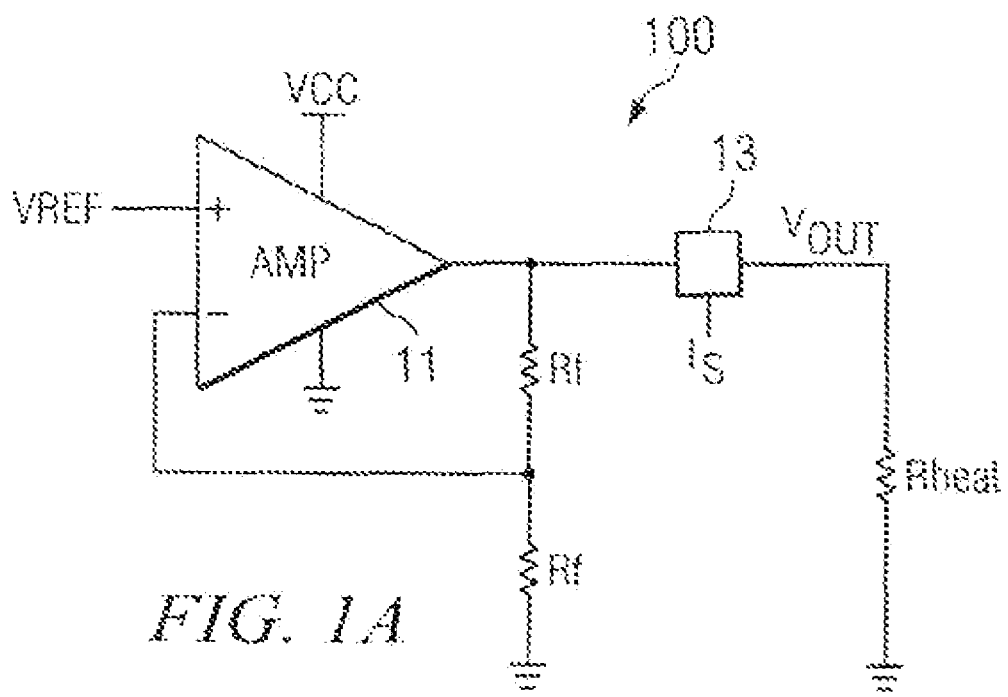
FIG. 1A illustrates a control schematic in accordance with exemplary embodiments of the present invention.

Referring now to FIG. 1A there is illustrated a circuit representation of a preamplifier 100 in accordance with exemplary embodiments of the present invention. The preamplifier 100 includes amplifier 11, feed back with resistors Rf, sensing device 13, and a heater, such as a heat element resistor (Rheat). The heater Rheat is in a heat transfer relationship with the head 120 and/or is integral to the head 120. The preamplifier 100 is cooperable with the operational power delivery circuits for the read and write mode such that approximately the same total power is delivered to the head 120 during both the read and write modes. Thus, the heat to the head 120 is managed by determining the power delivered to the head 120 for reading and writing and further delivering additional power to the heat resistor Rheat as needed to compensate for any head heat variances.

Since a heat resistor typically possesses a large temperature coefficient which causes the heater's resistance to vary depending on the power delivered to the heater, it is necessary to measure the current through the heat resistor in order to calculate the resistance and make appropriate adjustments to maintain power delivery to the head. However, it is also advantageous that the measurement circuitry not impede the FHC driver's ability to deliver maximum power. The amplifier 11 is used to accurately drive the heat resistor Rheat, where Vout=2×Vref. Vref is the reference voltage that can be programmed. The feedback through resistive divider Rf with gain of 2× not only ensures the accuracy of Vout, it also facilitates the Vref generator design since it does not need to be driven as high as Vout which needs to go close to the positive power supply voltage (VCC). By scaling the gain on the feedback, an amplifier can be used which does not require rail-to-rail voltage.

With a constant applied voltage of the present preamplifier 100, the heater resistance is determined by sensing the corresponding applied current with sensing device 13. The sensing device 13 can constantly sense the current such that the resistance can be monitored over time. The sensing device 13 includes an output for outputting the sensed current(FIG. 2) or voltage(FIG. 3) at node Isense to control devices for corrective adjustments as needed, for example in the event the resistance of the heater increases. Further to not degrade the driver's performance, the sensing device 13 produces a sensed current value (Is) which is only a small proportion of the actual current delivered to the heat resistor (Rheat).

In exemplary embodiments a vertical PNP or PMOS is used as the output device to deliver Vout. Therefore, the maximum Vout value would then be VCC-Vce for PNP, or VCC-Vds for PMOS. Exemplary current sensing schemes are shown in the circuit diagrams illustrated in FIGS. 2 and 3, where FIG. 2 illustrates a PNP version and FIG. 3 illustrates a PMOS version.

Figure 2:
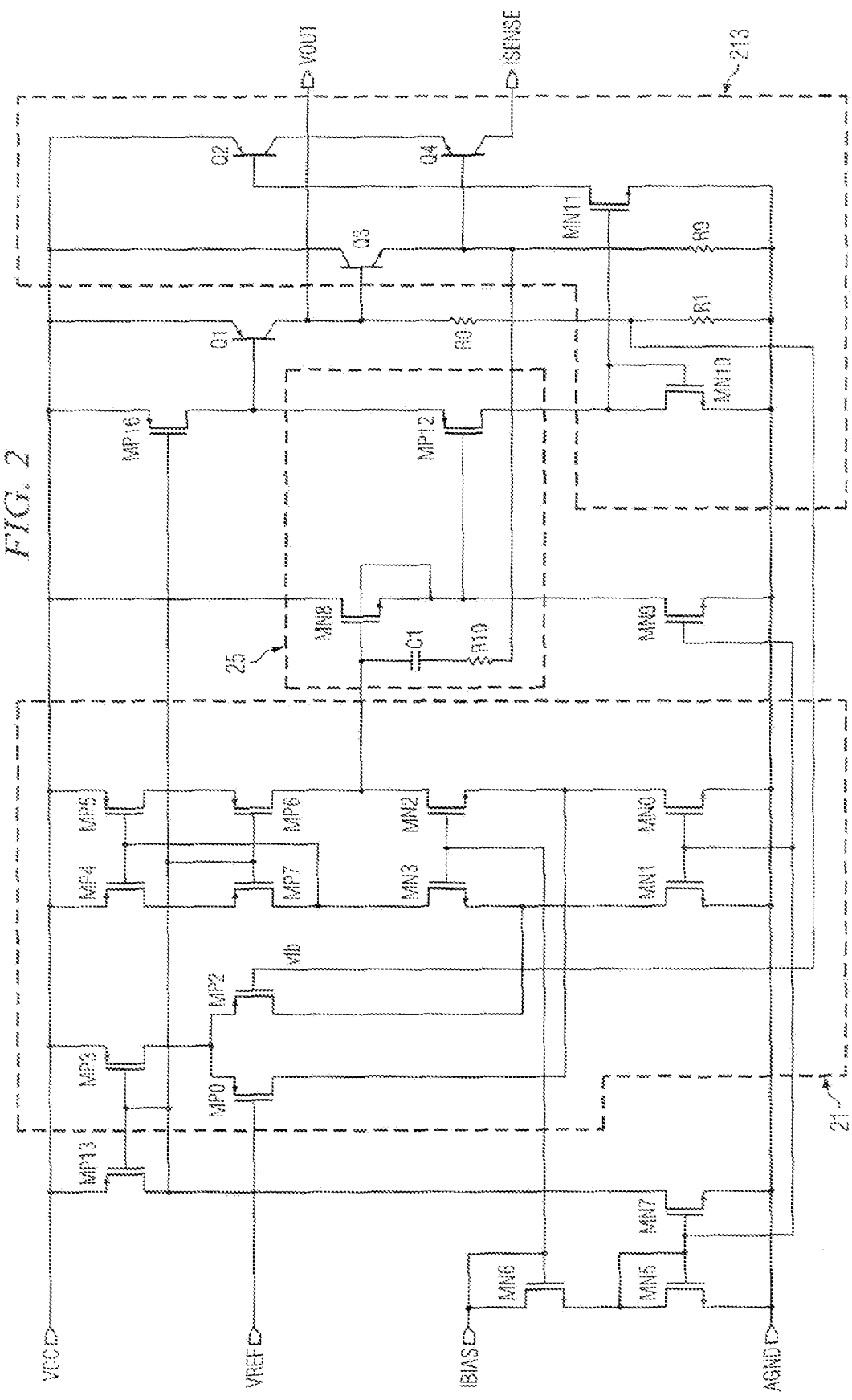
FIG. 2 illustrates a control circuit in accordance with exemplary embodiments of the present invention.
Figure 3:
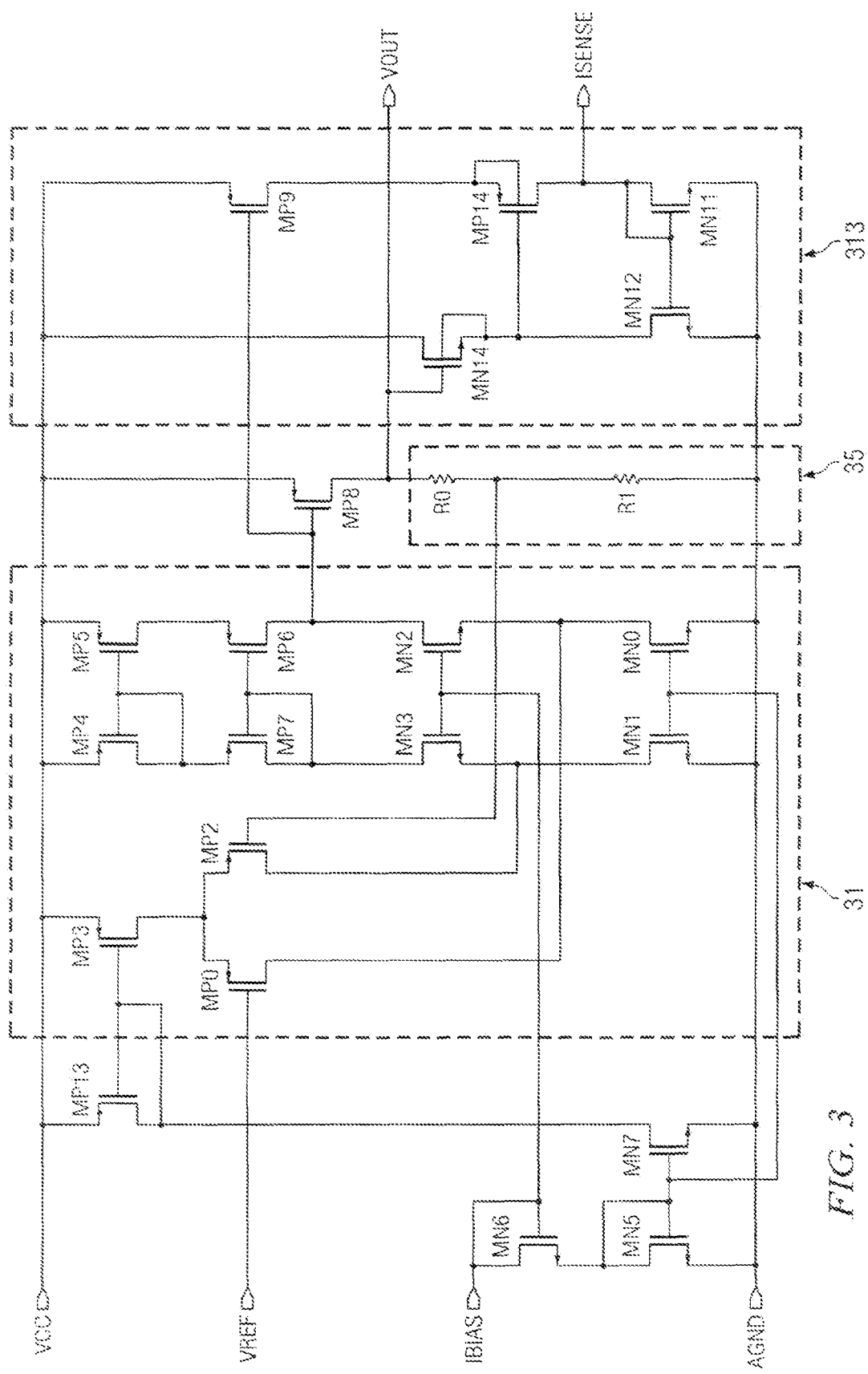
FIG. 3 illustrates a control circuit in accordance with exemplary embodiments of the present invention.

Referring now to FIG. 2 the circuit includes a conventional folded cascode amplifier portion (shown in dashed lines at 21) to provide high open-loop gain to ensure the accuracy of close-loop gain (2×), the output power PNP device (Q1), and the current sensing circuit (shown in dashed lines at 213). The circuit portion at item 25 (formed by MN8 with pull-down MN9, MP12 with pull-up MP16) provides the level shift and driver for the base current of Q1 such that the base current does not disturb the current matching in the folded cascode amplifier 21 formed by transistors MP0, MP2, MP3, MN0 . . . MN3, MP4 . . . MP7 with inputs VREF and vib. The amplifier and pull-down are biased by an input IBIAS and bias circuit formed by MN5 . . . MN7 and MP13. The amplifier is compensated by C1 in series with R10. The circuit ground is AGND.

For operation, the base current of the output power PNP Q1 is sensed by NMOS MN10. The current is then mirrored to MN11. In this example, the current is mirrored by a factor of 15. The current of MN11 is the base current of Q1 and Q2 are both which the area of Q2 is made to 1/15 of Q1. The emitters of Q1 and Q2 are both connected to VCC. The collector of Q1 is connected to resistors R0, R1. For improved current matching, collector of Vc of Q1 and Q2 should be similar and track each other. NPN Q3 (with pull down resistor R9) and PNP Q4 are added for this purpose, wherein the Vbe of Q3 and Q4 are of the same amplitude but reversed sign effectively canceling each other. The equation as can be derived from FIG. 2 is:

$$V_{CQ2}=V_{CQ1}-V_{be3}V+V_{be4}\approx V_{CQ1},$$

and thus, Q1 and Q2 have approximately the same Vce. Thus, the collector current of sense PNP Q2 is 1/15 power PNP Q1 and the outputted sensed current at node ISENSE is 1/15 that of the actual delivered current. In this way, an efficient bipolar current sense scheme is developed that does not degrade the driver's performance to deliver paper to the heat resistor Rheat.

For the case when an efficient vertical PNP is not available in the design process, the power PNP Q1 can be replaced by a PMOS in order to achieve high output voltage, as illustrated in the circuit shown in FIG. 3. The circuit of FIG. 3 includes a conventional folded cascade amplifier 31 formed by transistor MP0, MP2, MP3, MN0 . . . MN3, and MP4 . . . MP7, output device PMOS MP8, and sensing circuit 313. The circuit is biased by an input at node IBIAS into a mirror circuit formed by MN5, MN6, MN7 and MP13. The resistors R0, R1 at 35 are feedback resistor to form the feedback networks. The circuit ground is AGND.

In FIG. 3, PMOS MP8 is the power output device. To sense the current through the heat resistor, a sense PMOS MP9 is placed in close proximity to MP8. The gate of the sense PMOS MP9 is connected to the gate of power PMOS MP8, such that they have the same Vgs. They also have the same source voltage, which is VCC. In order to match the current well, the drain voltage of these two PMOS should be similar and track therefore devices MN14, MP14, MN11 and MN12 are added, wherein the voltage difference between the drain of MP8 and the drain of MP9 is Vgsmn14 down and then Vgsmp14 up. MN11 and MN12 form a current mirror to ensure Vgsmn14 is close to Vgsmp14 in amplitude. From FIG. 3, the following equation is derived:

$$V_{dMP9}=V_{dMP8}-V_{gsMN14}+V_{gsMP14}\approx V_{dMP8}.$$

The current mirror of MN11 and MN12 allows the current through MN14 to track the current through MP14, so that $V_{gsMN14} \approx V_{gsMP14}$. In this example, the size of MP9 is held to approximately 1/40 of MP8. Thus, the drain current of sense MOS MP9 is 1/40 of power MOS MP8.

Although exemplary embodiments of the invention are described above in detail, this does not limit the scope of the invention, which can be practiced in a variety of embodiments.

What is claimed is:

1. A circuit apparatus for maintaining a disk drive read/write head assembly at a substantially constant temperature during a read mode or a write mode, comprising:
   a transistor element in association with the read/write head and configured to output a control current to engender a heat;
   a sensing circuit configured to be responsive to a difference in heat of the read/write head during the read mode or the write mode;
   the sensing circuit including a transistor sensing element; and
   a control device, responsive to the heat difference determined by the sensing circuit, for adjusting the control current to compensate for the difference in heat.

2. The circuit apparatus of claim 1, wherein said control current during the read mode is greater than said control current during the write mode.

3. The circuit apparatus of claim 1 further comprising a heat resistor coupled to the transistor element, wherein the heat adjusted to said read/write head for compensating for the difference in heat is actuated by adjusting the corresponding amount of control current to the heat resistor and where the heat resistor is in a heat transfer relationship with said read/write head.

4. The circuit apparatus of claim 1, further comprises an amplifier.

5. The circuit apparatus of claim 1, wherein the transistor sensing element and the transistor element are of a same material.

6. The circuit apparatus of claim 1 wherein the transistor sensing element and the transistor element are bipolar transistors, configured to vary correspondingly to have comparable Vce (collector-emitter voltage).

7. The circuit apparatus of claim 1, wherein the transistor sensing element and the transistor element are MOSFET transistors, configured to vary correspondingly to have comparable Vds (drain-source voltage).

8. A circuit for maintaining a disk drive read/write head assembly temperature, comprising:
   a transistor element configured to output a control current operable to engender a heat;
   a sensing circuit configured to determine the control current;
   the sensing circuit including a transistor sensing element with its control node connected to a control node of the transistor heating element; and
   a control device driven by the sensing circuit for adjusting the control current;
   a heat resistor which is in a heat transfer relationship with said read/write head; and
   wherein a resistance of said heat resistor varies over a range of temperature and said control current delivered to said heat resistor is varied corresponding to said heat resistor resistance variance.

9. A circuit for maintaining a temperature of a disk drive read/write head assembly, comprising:
   a power output transistor in association with the read/write head and responsive to a control current;
   a sensing circuit configured to be responsive to a difference in heat of the read/write head during the read mode or the write mode;
   the sensing circuit including a sensing transistor;
   an amplifier driving the power output transistor; and
   a heat resistor, coupled to the power output transistor to receive the control current, and in a heat transfer relationship with said read/write head.

10. The circuit of claim 9, wherein the amplifier comprises a folded cascode amplifier.

11. The circuit of claim 9, wherein the power output transistor's and the sensing transistor's respective control nodes are connected together and respective sources nodes are connected together.

12. The circuit of claim 9, wherein a size of the power output transistor is an integer multiple size of the sensing transistor.

* * * * *